United States Patent
Gabelmann

(10) Patent No.: US 6,557,406 B2
(45) Date of Patent: May 6, 2003

(54) DEVICE FOR MEASURING THE TIRE PRESSURE IN A PNEUMATIC TIRE OF A VEHICLE

(75) Inventor: Volker Gabelmann, Niederstotzingen (DE)

(73) Assignee: Alligator Ventilfabrik GmbH (DE)

(*) Notice: Subject to any disclaimer, the term of this patent is extended or adjusted under 35 U.S.C. 154(b) by 0 days.

(21) Appl. No.: 10/199,292

(22) Filed: Jul. 18, 2002

(65) Prior Publication Data

US 2003/0015030 A1 Jan. 23, 2003

(30) Foreign Application Priority Data

Jul. 19, 2001 (DE) .................................. 201 11 704 U
Dec. 5, 2001 (DE) ..................................... 101 59 725

(51) Int. Cl.[7] .............................................. B60C 23/02
(52) U.S. Cl. ................................................ 73/146.5
(58) Field of Search ................ 73/146, 146.2, 73/146.3, 146.4, 146.5, 146.8; 340/442, 443, 444, 445, 447; 200/61.22

(56) References Cited

U.S. PATENT DOCUMENTS

| | | | | |
|---|---|---|---|---|
| 4,316,176 A | * | 2/1982 | Gee et al. | 340/447 |
| 4,686,855 A | * | 8/1987 | Smith | 73/146.8 |
| 5,731,516 A | * | 3/1998 | Handfield et al. | 73/146.5 |
| 6,025,777 A | * | 2/2000 | Fuller et al. | 340/442 |

* cited by examiner

Primary Examiner—William Oen
(74) Attorney, Agent, or Firm—Bachman & LaPointe, P.C.

(57) ABSTRACT

In a device for measuring a tire pressure in a pneumatic tire of a vehicle by means of a measurement value sensor which is acted upon by the tire pressure and which is associated with a receiver, at the rim bed of a rim for the pneumatic tire, which rim accommodates the tire valve, connected to the tire valve which has a retaining nut is an electronics or signal housing which is associated with the rim base and which has base bar portions and which includes an electronic transmitter device as the measurement value sensor for the tire pressure and is connected to the tire valve by a hollow screw engaging into the valve bore and can be adjusted with respect thereto. Disposed at the inside of the retaining nut is projection as a desired-rupture element, and the base bar portions of the signal housing are pressed against the rim base by the hollow screw. The projection belongs to an installation portion at the inside surface of the retaining nut and is in the form of a leg provided at that inside surface.

9 Claims, 1 Drawing Sheet

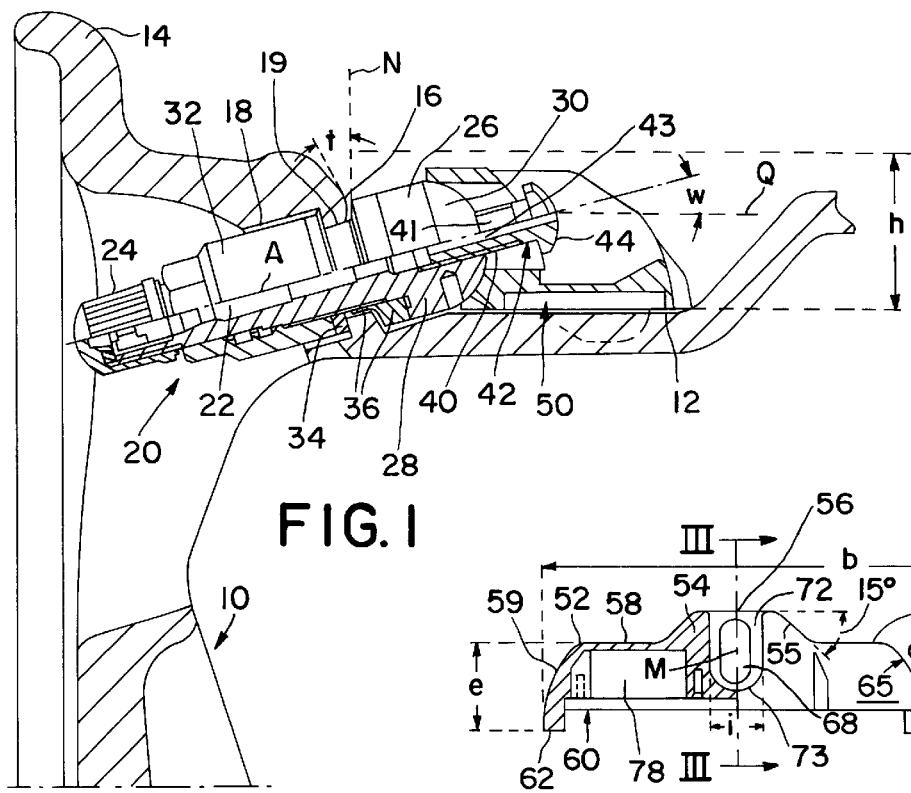

DEVICE FOR MEASURING THE TIRE PRESSURE IN A PNEUMATIC TIRE OF A VEHICLE

BACKGROUND OF THE INVENTION

The invention concerns a device for measuring the tire pressure in a pneumatic tire of a vehicle by means of a measurement value sensor, which is acted upon by the tire pressure, at the rim base of a rim receiving a tire valve, for the pneumatic tire, outside which a receiver is associated with the measurement value sensor, wherein connected to the tire valve which has a retaining nut is an electronics or signal housing which is associated with the rim base and which has base bar portions as well as an electronic sender means as the measurement value sensor for the tire pressure. The signal housing is connected to the tire valve by a hollow screw engaging into the valve bore and is adjustable with respect thereto.

DE 37 34 053 A1 to the present applicants describes a device for measuring the tire pressure in a pneumatic tire of a vehicle. A folding bellows arrangement is disposed in the pneumatic tire in a direction of movement which is approximately parallel to the axis and is connected to a permanent magnet which is displaceable in parallel relationship with the axis in dependence on the tire pressure at the outside of the tire and which changes its measurable position, in the event of deviations from the normal tire pressure. An electronic component is proposed as a stationary pick-up means outside the pneumatic tire. The electronic component, by virtue of the so-called Hall effect, respectively produces a voltage perpendicularly to a flow of current and a magnetic field. The above-mentioned Hall effect is based on the consideration that, in electrical conductors which are disposed in a homogeneous magnet field and in which an electrical current flows perpendicularly thereto, a voltage difference occurs, perpendicularly to the magnetic filed and perpendicularly to the current. The magnitude of that effect is dependent on the conductor material and is characterized by the respective Hall constant.

Practice has shown now that, in the case of the measurement value sensor which rotates about the axis of the wheel, as a consequence of frictional forces, caused by the centrifugal force which occurs, as between the folding bellows means or the holder of the permanent magnet on the one hand and the pressure tube on the other hand, the axial movement of the permanent magnet, which is required for measurement purposes, can be disturbed, a hysteresis effect occurs. The latter impedes fulfilment of the demand for a linear relationship, which is independent of speed of rotation, between the tire pressure and the movement of the measurement value sensor.

In order now to simplify fitting the measurement value sensor in the region of the rim and to ensure the operational reliability and security thereof even when the vehicle tire is changed, DE 296 23 466 U1 to the present applicants proposes a device of the general kind set forth. This is delivered to the vehicle manufacturer in parts and put together by same upon assembly.

SUMMARY OF THE INVENTION

In consideration of the state of the art, the object of the present invention, in a further development of the wheel module, is to afford a modification to the system for the purposes of simplifying assembly.

That object is attained by the teaching of the independent claim; the appendant claims set forth advantageous developments. In addition, the scope of the invention embraces all combinations of at least two of the features disclosed in the description, the drawing and/or the claims.

In accordance with the invention, provided at the inside or in the interior of the retaining nut is a projection as a desired-rupture element. This can be associated as a possibly separate installation component with the inside surface of the retaining nut and is preferably in the form of a leg or flange extending around the retaining nut at the inside surface thereof. In addition, the base bar portions of the signal housing are pressed by the hollow screw against the rim base.

In accordance with a further feature of the invention, the surface pressure between the screw head and the electronics housing is so selected that, upon actuation of the retaining nut, the torque rises to such an extent that the inwardly disposed web or flange is sheared off when a given torque, between about 3 Nm and 6 Nm, is exceeded, by the bolt screw thread. Advantageously the torque is so selected that the hollow screw is tightened before the web or flange is sheared off by rotating the valve.

In addition, it has proven to be advantageous for the screw head to be held in positively locking relationship to prevent rotational movement thereof in the signal or electronics housing, For that purpose, the screw head has at least in part a polygonal periphery which bears snugly in positively locking relationship with surface portions against the interior of the signal housing.

In the condition as delivered at the customer, the valve body and the electronic unit are loosely movably pre-assembled with a screw. The retaining nut and the valve cap are supplied separately. Alternatively, the retaining nut can be assembled with a more slender valve cap which is screwed on. For the purposes of fixing the unit, the valve body is fitted through the hole in the rim and the retaining nut is screwed fast until it bears against the rim. For the assembly procedure, that affords a substantial simplification in comparison with present day processes.

BRIEF DESCRIPTION OF THE DRAWINGS

Further advantages, features and details of the invention will be apparent from the description hereinafter of a preferred embodiment and with reference to the drawing in which:

FIG. 1 is a partial cross-section through a rim for a vehicle tire with a tire valve and a signal housing fixed thereto, FIG. 2 is a partly sectional rear view of the signal housing, FIG. 3 is a view in longitudinal section taken along line III—III in FIG. 2 through the signal housing, FIG. 4 is a partly sectional side view of the signal sing with tire valve, and FIG. 5 shows a front view of a part in the signal sing.

DETAILED DESCRIPTION OF THE PREFERRED EMBODIMENT(S)

FIG. 1 shows a part of a rim 10 which is die-cast from an aluminum alloy for a motor vehicle wheel (not shown) with a rim flange 14 which projects above a rim base or well 12. A valve hole 18 for a tire valve 20 is formed in the outer side portion 16 of the rim base 12 in such a way that the longitudinal axis A thereof extends at an angle of inclination w of 25° relative to a line Q parallel to the axis of the wheel. The height h of the side portion 16 can be of different dimensions, and likewise in regard to the angle of inclination w to which the angle t of the side portion to the line N normal to the axis corresponds. Here this also measures about 25°.

In a valve body 22 of a coated, for example anodized, aluminum alloy the tire valve 20 has a valve insert (which cannot be seen here) with an axial valve bore which is covered by a valve cap 24. The valve body 22 is provided with an axial bore (this cannot be clearly seen) and, at the end remote from the valve cap 24, the valve foot 26, it has a radially projecting collar 28 which goes into an end surface 30 of dome-like spherical configuration. Between the collar 28 and a disk 26 which is supported against a union and retaining nut 32, the edge 19 of the valve hole 18 in the side portion 16 bears snugly against an elastic ring 38 of stepped cross-section. The retaining nut 32 is provided at its inside 33 with a rib 34 which is formed thereon in peripherally extending relationship and which, upon being screwed on to the tire valve 20, as from a given position, runs on to the beginning of the screwthread of the tire valve 20 and thus produces a torque which rotates the entire tire valve 20.

The shank 41, which is provided with a male screwthread 40, of a hollow screw 42 is screwed into the axial bore in the valve body 22. The hollow screw 42 has a screw head 44 with a polygonal periphery, which prolongs the axial hollow space 43 in the shank 41 of the screw. The possibly partially curved side surfaces 46 of the screw head 44 form corners 48 and bear in portion-wise manner in surface contact against counterpart surfaces, forming a positively locking connection. The positively locking fit of the hollow screw 42 provides that it is screwed into the tire valve 20 when the latter, as discussed above, is rotated by virtue of the torque produced when passing on to the peripherally extending rib 33. As soon as the screw head 44 of the hollow screw 42 exerts a sufficiently high surface pressure against the signal housing 50, the torque of the nut 32 rises, the rib 33 is sheared off and the nut 32 can be actuated until it is caused to bear against the rim 10, for the further assembly process.

The above-mentioned counterpart surfaces for the side surfaces 46 and corners 48 of the screw head 44 are moreover afforded by an electronics or signal housing 50 which the screw head 44 presses against the valve collar 28.

The signal housing 50 is formed from a light plastic material which is stable in respect of shape and it comprises a virtually cuboidal base portion 52, of a greatest length a of somewhat more than 30 mm, a total width b of about 60 mm and a base height e of 10 mm, and a shaped portion 54 which sticks up at the center line M of the base portion 52. The shaped portion 54 has flank surfaces 55 which are inclined relative to each other and therebetween a top surface 56 which extends parallel to shoulder surfaces 58 of the base portion 52 and the bottom surface 60 thereof. Projecting from the latter, in a position of prolonging two narrow sides or end faces 59 of the base portion 52, are keel-like base or foot bar portions 62. The height k of the foot bar portions 62 is about 4 mm, with a bar portion length n of 15 mm.

In the position of installation diagrammatically shown in FIG. 1, the foot bar portions 62 rest on the rim base 12. The end faces 59 are inclined curvedly upwardly and inwardly at an angle q of about 35° relative to the vertical, while the angle of inclination z of the front surface 65 measures about 40°.

The longitudinal wall which in the position of installation faces towards the side portion 16 of the rim 10, constituting the rear surface 64 of the signal housing 50, is inclined relative to the bottom surface 60 at an angle f of here about 75°. At that surface, formed in the shaped portion 54 of the housing is a recess 66 of approximately part-spherical shape, from which extends a slot 68, which is directed parallel with respect to the vertical, and which is arranged in a transverse wall 70 of the shaped portion 54 of the housing, the transverse wall 70 extending in parallel relationship with respect to the inclined rear surface 64 and being slightly curved in cross-section.

The transverse wall 70 separates the recess 66 from an apex groove 72 which is provided centrally in the shaped portion 54 of the housing and which is of a groove width i of, in this case, 8 mm, the groove walls 74 thereof, which flank a rounded groove bottom 73, being directed in parallel relationship with the center line M of the signal housing 50. The groove walls 74 terminate at inclined surfaces 76 of the shaped portion 54 of the housing. Those inclined surfaces 76, the angle of inclination of which is 45°, go into the other longitudinal wall, the front face 65 of the signal housing 50.

Arranged on both sides of the groove 72 in the base portion 52, starting from the bottom surface 60, is a respective insert space 78 which is circular in plan view and which is of a diameter of about 15 mm. The signal housing 50 serves for accommodating, near the valve, a baby cell and an electronic transmitter means, both inserts are not shown in the drawing, for reasons of enhanced clarity thereof.

The signal housing 50 is fixed in the described manner by means of the hollow screw 42 to the tire valve 20 and thus to the rim base 22 and, in particular by virtue of the recess 66 with its negative part-circular surface and its counterpart portion, the peripheral surface 30 of the valve collar 28, can also adapt to side portions 16 involving different side portion angles t.

The described manner of suspending the signal housing 50 by means of the hollow screw 42, preferably comprising nickel-plated steel, with the two foot bar portions 62 which rest on the rim base 12, forms an operationally reliable three-point fixing for the signal housing 50.

When the components are delivered, the valve body 22 and the electronic unit are pre-assembled by the hollow screw 42 in such a way that full mobility of the electronic unit is guaranteed. Upon fitting into the wheel, the tire valve 20 is fitted through the hole 18 in the rim and the nut 32 is tightened until it bears against the rim 10, by means of a suitable tool.

What is claimed is:

1. A device for measuring tire pressure in a pneumatic tire of a vehicle by means of a measurement value sensor, which is acted upon by the tire pressure, at a rim base of a rim receiving a tire valve, for the pneumatic tire, outside which a receiver is associated with a measurement value sensor, wherein connected to a tire valve which has a retaining nut is an electronics or signal housing which is associated with the rim base and which has base bar portions and which includes an electronic sender means as the measurement value sensor for the tire pressure and is connected to the tire valve by a hollow screw engaging into a valve bore and being adjustable with respect thereto, said device including, provided at the inside of the retaining nut, a projection serving as a desired-rupture element and the base bar portions of the signal housing being pressed against the rim base by the hollow screw.

2. A device as set forth in claim 1, wherein the projection belongs to an installation part at an inside surface of the retaining nut.

3. A device as set forth in claim 1, wherein the projection is formed by a flange provided at an inside surface of the retaining nut.

4. A device as set forth in claim 3, wherein the flange extends peripherally at the inside surface of the retaining nut.

5. A device as set forth in claim 3, wherein the flange is sheared off when a predetermined torque is exceeded.

6. A device as set forth in claim 5, wherein said torque is between 3 Nm and 6 Nm.

7. A device as set forth in claim 1, wherein the hollow screw has a screw head and the screw head is at least partially of a polygonal periphery and is connected in positively locking relationship in regions of the periphery to the housing.

8. A device as set forth in claim 2, wherein the projection is sheared off when a predetermined torque is exceeded.

9. A device as set forth in claim 8, wherein said torque is between 3 Nm and 6 Nm.

\* \* \* \* \*